(12) United States Patent
Dagland et al.

(10) Patent No.: US 11,130,122 B2
(45) Date of Patent: Sep. 28, 2021

(54) PIPETTE TIP CONTAINER

(71) Applicant: Bio-Rad Europe GmbH, Basel (CH)

(72) Inventors: Typhaine Dagland, Marnes-la-Coquette (FR); Gilles Venturi, Marnes-la-Coquette (FR); Vincent Doury, Marnes-la-Coquette (FR); Laurent Fournier, Marnes-la-Coquette (FR)

(73) Assignee: Bio-Rad Europe GmbH, Basel (CH)

( * ) Notice: Subject to any disclaimer, the term of this patent is extended or adjusted under 35 U.S.C. 154(b) by 273 days.

(21) Appl. No.: 16/289,474

(22) PCT Filed: Aug. 31, 2017

(86) PCT No.: PCT/EP2017/071895
§ 371 (c)(1),
(2) Date: Feb. 28, 2019

(87) PCT Pub. No.: WO2018/041965
PCT Pub. Date: Mar. 8, 2018

(65) Prior Publication Data
US 2019/0308187 A1    Oct. 10, 2019

(30) Foreign Application Priority Data

Sep. 2, 2016 (EP) ..................... 16306109

(51) Int. Cl.
*B01L 3/00* (2006.01)
*B01L 3/02* (2006.01)
*G01N 35/10* (2006.01)

(52) U.S. Cl.
CPC ............. *B01L 3/0275* (2013.01); *B01L 3/52* (2013.01); *B01L 2200/12* (2013.01);
(Continued)

(58) Field of Classification Search
CPC .. B01L 3/0275; B01L 3/52; B01L 3/02; B01L 3/00
(Continued)

(56) References Cited

U.S. PATENT DOCUMENTS 6,143,252 A * 11/2000 Haxo, Jr. ............. B01J 19/0046
422/131
2002/0110817 A1    8/2002 Tajima
(Continued)

FOREIGN PATENT DOCUMENTS

| EP | 2153900 A1 | 2/2010 |
|---|---|---|
| EP | 2878953 A1 | 6/2015 |
| KR | 20140068437 A | 6/2014 |

OTHER PUBLICATIONS

Extended EPO Search Report from European Patent Application No. 16306109.6 dated Feb. 8, 2017.
(Continued)

*Primary Examiner* — Christine T Mui
(74) *Attorney, Agent, or Firm* — Fenwick & West LLP (57) ABSTRACT

A pipette tip container comprising a pipette tip having a lumen extending between a proximal opening of a first diameter and a distal orifice of a second smaller diameter; a pellet arranged in the lumen of the pipette tip between said proximal opening and distal orifice, the second diameter being too narrow to let the pellet pass; and a retainer arranged between the pellet and the proximal opening and arranged to prevent the pellet from moving past the retainer in the lumen but to let fluid move past the retainer in the lumen; the retainer having a distal end such that a portion of its periphery does not contact the inner wall of the lumen, a proximal end such that a portion of its periphery maintains the retainer in the lumen by friction with the inner wall of the lumen; and a radial opening between the distal and proximal ends.

22 Claims, 7 Drawing Sheets

(52) U.S. Cl.
CPC ... *B01L 2200/16* (2013.01); *B01L 2300/0609* (2013.01); *B01L 2300/0681* (2013.01); *B01L 2300/0832* (2013.01); *B01L 2300/0858* (2013.01); *G01N 2035/1055* (2013.01)

(58) Field of Classification Search
USPC .................................................. 422/547, 500
See application file for complete search history.

(56) References Cited

U.S. PATENT DOCUMENTS

| | | | |
|---|---|---|---|
| 2009/0221080 A1* | 9/2009 | Tajima | C12Q 1/6804 436/43 |
| 2010/0028934 A1 | 2/2010 | Schacher et al. | |
| 2016/0033543 A1 | 2/2016 | Stankus et al. | |

OTHER PUBLICATIONS

Office action from European Patent Application No. 16306109.6 dated Feb. 11, 2019.
PCT International Preliminary Report on Patentability (Chapter I) with Written Opinion from PCT/EP2017/071895 dated Mar. 5, 2019.
International Search Report for PCT/EP2017/071895 dated Oct. 25, 2017, provided by WIPO.
Written Opinion of the International Search Authority for PCT/EP2017/071895 dated Oct. 25, 2017, provided by WIPO.

\* cited by examiner

PIPETTE TIP CONTAINER

CROSS-REFERENCE TO RELATED APPLICATIONS

This present application is the U.S. national phase of PCT/EP2017/071895 filed on Aug. 31 2017, which claims priority to and claims the benefit of European Patent Application No. EP16306109 filed Sep. 2, 2016, the disclosures of which are incorporated herein by reference.

TECHNICAL FIELD

This presentation relates to the long-term storage (especially long-term stability) of solid reagents, and in particular to a container for efficiently storing solid reagents and a method of use of the container.

BACKGROUND

Some reagents and especially some biological reagents, for example some proteins or enzymes for in-vitro diagnosis, are not stable for a long time when they are in a liquid form and ready to use (problem of long-term stability, on board stability and/or thermal stress stability). Storing such unstable reagents, for example over a period such as 18 months, can be done by storing the reagents in a solid form such as a lyophilized form. A reagent in a solid form such as a lyophilized (freeze-dried) form is generally stored in a brown glass bottle sealed with a rubber septum, the inside of the bottle being either under vacuum or filled with a neutral gas, to preserve the reagent from moisture and degradation (loss of physical stability and/or reactivity).

To use such a reagent one must: introduce a precise volume of diluent or solvent in the bottle; mix the reagent with the diluent until the solution is homogeneous; then remove the solution from the bottle for use. Introduction of the diluent then transfer of the homogeneous solution can be accomplished by opening and closing the bottle or using a syringe needle that passes through the septum.

Such a known process comprises a number of drawbacks, such as being long to implement due to the number of manipulations involved and large volumes to handle (when dilution is automatized), or delicate to implement due to the care that must be taken to introduce a precise volume of diluent in the bottle. Further, some solid reagent can be lost if the bottle is opened and closed and some dissolved reagent can remain unreachable in the bottle if a syringe is used.

Many attempts to automatize the process of mixing a solid reagent with a diluent have been unsuccessful. Manufacturers of in-vitro diagnosis medical systems, for example, require their users to manually dilute the solid state reagents to be used in their in-vitro diagnosis medical systems.

There exists a need for a container that facilitates an automated mixing of a solid reagent with a diluent.

SUMMARY

An embodiment of the present disclosure comprises a pipette tip container having: a pipette tip with a lumen extending between a proximal opening of a first diameter and a distal orifice of a second smaller diameter; a soluble pellet arranged in the lumen of the pipette tip between said proximal opening and distal orifice, the second diameter being too narrow to let the pellet pass; and a retainer arranged between the pellet and the proximal opening and arranged to prevent the pellet from moving past the retainer in the lumen but to let fluid move past the retainer in the lumen; the retainer having a distal end arranged such that a portion of its periphery does not contact the inner wall of the lumen and a proximal end arranged such that a portion of its periphery maintains the retainer in the lumen by friction with the inner wall of the lumen.

An embodiment of the present disclosure comprises a pipette tip container with: a pipette tip having a lumen extending between a proximal opening of a first diameter and a distal orifice of a second diameter, smaller than the first diameter; at least one pellet of material arranged in the lumen of the pipette tip between said proximal opening and distal orifice, wherein the second diameter is too narrow to let the pellet pass; and a retainer arranged in the lumen between the pellet and said proximal opening, the retainer being arranged to prevent the at least one pellet from moving past the retainer in the lumen but to let fluid move past the retainer in the lumen; the retainer having a distal end and a proximal end, wherein the distal end of the retainer is circumscribed within a third diameter and the proximal end of the retainer is circumscribed within a fourth diameter, larger than the third diameter, wherein at least a first portion of a periphery of the distal end of the retainer does not contact an inner wall of the lumen and wherein at least a portion of a periphery of the proximal end of the retainer exerts resilient pressure on the inner wall of the lumen and maintains the retainer in the lumen by friction with the inner wall of the lumen.

According to an embodiment of the present disclosure, the lumen is conical.

According to an embodiment of the present disclosure, the pipette tip comprises a further lumen axially aligned with the lumen; the further lumen extending between the distal orifice of the lumen and a distal extremity of the pipette tip; the further lumen having a diameter larger than said second diameter.

According to an embodiment of the present disclosure, the distal end of the retainer is distant from the proximal end of the retainer by a height larger than said fourth diameter.

According to an embodiment of the present disclosure, said at least a portion of a periphery of the proximal end of the retainer that contacts the inner wall of the lumen comprises at least two pad portions coupled each to the distal end of the retainer by a resilient arm.

According to an embodiment of the present disclosure, each resilient arm comprises a radial opening between the proximal end of the retainer and the distal end of the retainer, each radial opening developing from said first portion of a periphery of the distal end of the retainer; the radial openings in the arms communicating with an axial opening in the proximal end of the retainer.

According to an embodiment of the present disclosure, said at least one pellet of material comprises at least two pellets of material.

According to an embodiment of the present disclosure, said at least two pellets of material have a same shape and a same size.

According to an embodiment of the present disclosure, said at least one pellet of material is hemispherical.

According to an embodiment of the present disclosure, the distal end of the retainer comprises an axial opening and the beginning of at least one lateral opening developing further in the retainer; the axial opening and the lateral opening having non-parallel axis.

According to an embodiment of the present disclosure, said retainer has a longitudinal axis and said at least a portion of a periphery of the proximal end of the retainer that contacts the inner wall of the lumen comprises at least two resilient pad portions following each an arc of a circle concentric with said longitudinal axis, each pad portion coupled to the distal end of the retainer by a resilient arm that comprises a radial opening between the proximal end of the retainer and the distal end of the retainer; wherein the distal end of the retainer comprises a ring portion concentric with said longitudinal axis and attached to a distal portion of each of said resilient arms; an outer diameter of said ring portion being reduced in an alignment of the radial opening of each resilient arm.

According to an embodiment of the present disclosure, a distal portion of the inner wall of the lumen comprises a protrusion arranged to prevent a full periphery of said at least one pellet from contacting a full periphery of the inner wall of the lumen.

According to an embodiment of the present disclosure, a distal portion of the lumen comprises a stopper arranged to prevent said at least one pellet from reaching a position close to the distal orifice of the lumen where a full periphery of said at least one pellet could contact a full periphery of the inner wall of the lumen; the stopper being arranged to provide a fluid path through the lumen.

According to an embodiment of the present disclosure, the pipette tip container comprises between said retainer and said proximal opening a filter that prevents passage of solids or liquids.

According to an embodiment of the present disclosure, the pipette tip is made of a transparent material.

According to an embodiment of the present disclosure, said pellet is comprised of, or comprises, soluble reactant.

An embodiment of the present disclosure comprises a method of use of the pipette tip outlined above, the method comprising: attaching said proximal end to a pipette body; drawing into the pipette tip a volume of solvent of said soluble material up to at least said distal end of said retainer; and after at least a portion of said pellet was dissolved, emptying solvent and dissolved material from the pellet into a desired container.

According to an embodiment of the present disclosure, the method comprises, as long as the soluble reactant of the pellet is not completely dissolved, repeating said drawing of the solvent up to at least said distal end of said retainer; and emptying said solvent and dissolved material from the pellet into said desired container.

According to an embodiment of the present disclosure, the method comprises, after the soluble reactant of the pellet has completely dissolved and the last material dissolved from the pellet has been emptied into said desired container, drawing the solvent up to its previous height of drawing, plus a predetermined fraction of the height of the lumen; and emptying said drawn solvent into said desired container.

According to an embodiment of the present disclosure, the method comprises repeating said drawing of the solvent up to an increasing height of the lumen and said emptying said drawn solvent into said desired container until the solvent has been drawn to a predetermined height of the lumen and emptied into said desired container.

An embodiment of the present disclosure comprises a method of making a pipette tip container as outlined above; the method comprising: providing said pipette tip; introducing by the proximal opening said at least one pellet of material in the lumen of the pipette tip; introducing by the proximal opening said retainer in the lumen, such that said at least a portion of a periphery of the proximal end of the retainer contacts the inner wall of the lumen; and pushing said retainer in the lumen with an elongated member narrower than the lumen until the retainer reaches a desired position in the lumen.

According to an embodiment of the present disclosure, the method comprises arranging at a desired position in the lumen, between the retainer and the proximal opening, a filter that prevents passage of solids or liquids.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figures 1A, 1B, 1C:
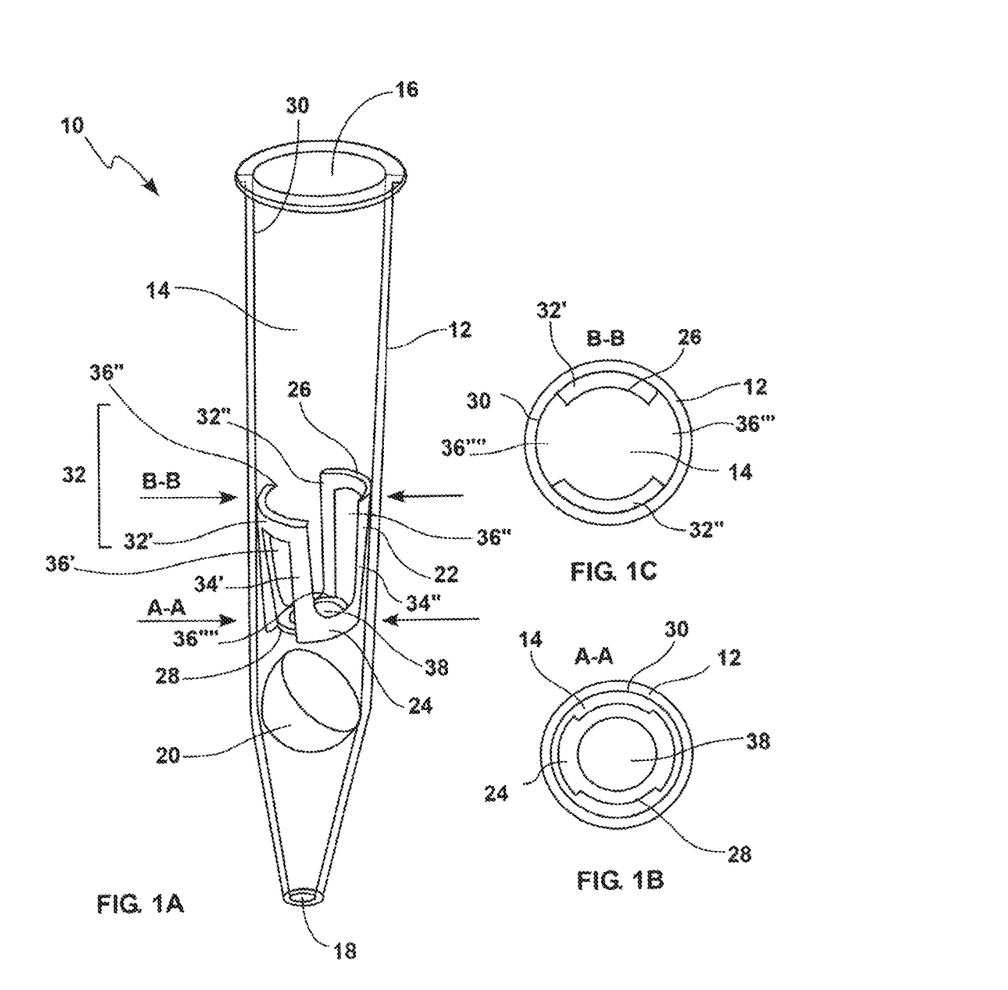
FIG. 1A schematically represents a pipette tip container according to an embodiment of this presentation.
FIG. 1B schematically represents a first radial cross section of the pipette tip container of FIG. 1A.
FIG. 1C schematically represents a second radial cross section of the pipette tip container of FIG. 1A.
Figure 2A:
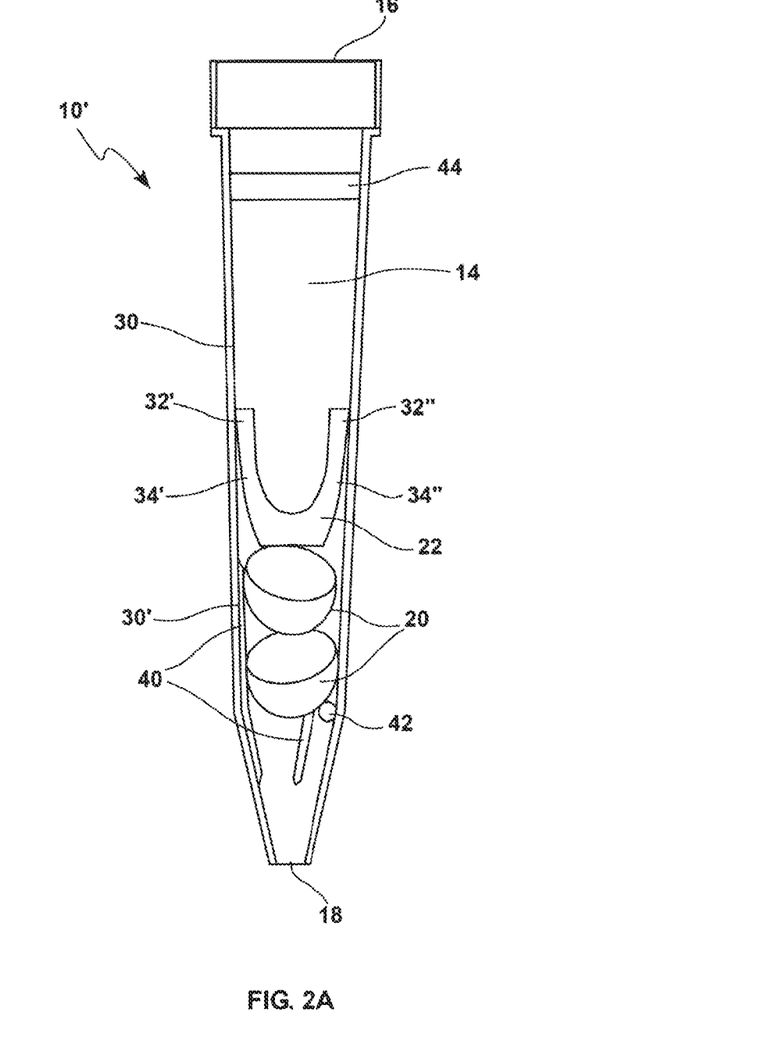
FIG. 2A schematically represents a pipette tip container according to an embodiment of this presentation.
Figure 4:
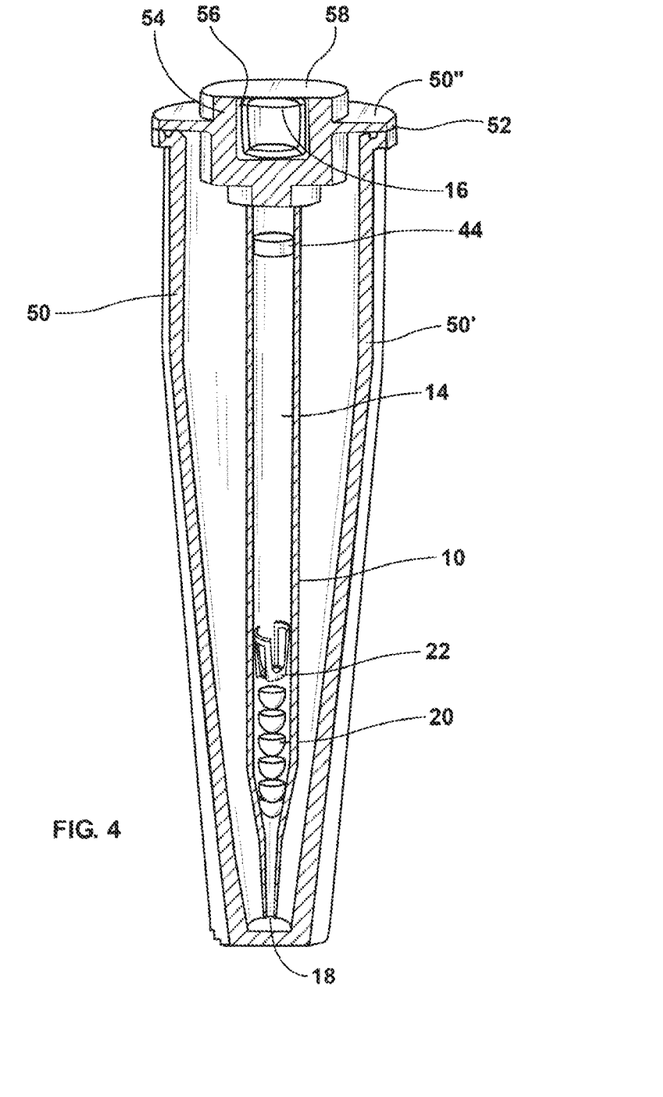
FIG. 4 schematically represents an elevation view of a packaged retainer according to an embodiment of this presentation.

FIG. 1A schematically represents a pipette tip container 10 according to an embodiment of this presentation, comprising a pipette tip 12 having a lumen 14 extending between a proximal opening 16 of a first diameter and a distal orifice 18 of a second diameter, smaller than the first diameter. According to an embodiment of this presentation, distal orifice 18 can open at the distal extremity of pipette tip 12 as illustrated in FIG. 1A. It can also open into a further lumen, as detailed and illustrated hereafter. According to an embodiment of this presentation, the lumen of the pipette tip can be conical or non-conical. A non-conical lumen can for example be cylindrical, with only a distal section having a distal orifice of reduced diameter. According to an embodiment of this presentation, the outer walls of the pipette tip can be conical or non-conical; for example cylindrical. According to an embodiment of this presentation, the lumen 14 generally has the shape of a cone, or of at least one trunk of a cone arranged at the end of a cone (as illustrated in FIG. 1A). As illustrated in FIGS. 2 and 4, according to an embodiment of this presentation, a proximal portion of the pipette tip 12 can be cylindrical with a cylindrical lumen. According to an embodiment of this presentation, at least one pellet 20 of material is arranged in the lumen 14 of the pipette tip 12 between said proximal opening 16 and distal orifice 18, and the diameter of the distal orifice is too narrow to let the pellet pass.

According to an embodiment of this presentation, a retainer 22 is arranged in the lumen 14 between the pellet 20 and said proximal opening 16. According to an embodiment of this presentation, the retainer 22 is arranged to prevent the at least one pellet 20 from moving past the retainer 22 in the lumen 14, but is arranged to let fluid such as a gas or liquid move past the retainer 22 in the lumen 14. According to an embodiment of this presentation, the retainer 22 is arranged to let fluid such as a gas or liquid pass through the retainer 22 in the lumen 14. According to an embodiment of this presentation, the pipette tip is made of a transparent material. According to an embodiment of this presentation, the pipette tip and/or the retainer are made of polypropylene, which can be transparent (for example in the case of the pipette tip) or opaque (for example in the case of the retainer).

According to an embodiment of this presentation, the retainer 22 has a distal end 24 and a proximal end 26, wherein the distal end of the retainer is circumscribed within a third diameter and the proximal end of the retainer is circumscribed within a fourth diameter, larger than the third diameter. According to an embodiment of this presentation, the retainer 22 is arranged such that at least a first portion 28 of a periphery of the distal end 24 of the retainer does not contact the inner wall 30 of the lumen 14 and such that at least a portion 32 of a periphery of the proximal end 26 of the retainer 22 exerts resilient pressure on the inner wall 30 of the lumen 14, and maintains the retainer 22 in the lumen 14 by friction with the inner wall 30 of the lumen 14. According to an embodiment of this presentation, the retainer 22 is arranged such that it cannot slide back down in the pipette tip container 10 if said container gets turned over.

According to an embodiment of this presentation, the distal end 24 of the retainer 22 is distant from the proximal end 26 of the retainer 22 by a height larger than the larger diameter (said fourth diameter) of the retainer 22. This feature facilitates the positioning of the retainer 22 in the lumen 14.

As detailed hereafter, according to an embodiment of this presentation, the at least a portion 32 of a periphery of the proximal end 26 of the retainer 22 that contacts the inner wall 30 of the lumen 14 comprises at least two pad portions 32', 32" coupled each to the distal end 26 of the retainer 22 by a resilient arm 34', 34". According to an embodiment of this presentation, each resilient arm 34', 34" comprises a radial opening 36', 36" between the proximal end 26 of the retainer 22 and the distal end 24 of the retainer 22, each radial opening developing from the first portion 28 of the periphery of the distal end of the retainer; the radial openings 36', 36" in the arms 34', 34" communicating with an axial opening (such as the axial space between the arms 34', 34" in FIG. 1A) in the proximal end 26 of the retainer 22.

According to an embodiment of this presentation, the retainer 22 additionally comprises two radial openings 36''', 36'''' between the arms 34', 34" on each side of retainer 22, between the proximal end 26 and the distal end 24. According to an embodiment of this presentation, the distal end 24 of the retainer 22 comprises an axial opening 38; the axial opening 38 and the lateral openings 36', 36", 36''' and 36'''' having non-parallel axis.

According to an embodiment of this presentation that is not illustrated, retainer 22 can also be a cone of resilient material that comprises one or more generally axial grooves along its surface, and that can comprise an axial lumen.

According to an embodiment of this presentation "pellet" can mean an aggregate of one or several reagents (for example biological and/or chemical reagents) in the solid form, for example lyophilized reagent(s) and in particular freeze-dried reagent(s). The pellet or at least one pellet in the container then consists of or comprises one or several soluble reagent(s). According to an embodiment of this presentation, by "soluble" it is meant herein that can be dissolved (or made into solution) in an aqueous, organic, polar or non-polar solvent or a mixture thereof. According to an embodiment of this presentation, one or several pellets in the container further comprise one or several insoluble reagent(s), for example particles (or beads) such as silica or magnetic particles. According to an embodiment of this presentation, the retainer is arranged to prevent both the particles and the at least one pellet from moving past the retainer in the lumen of the pipette tip but to let fluid move past the retainer in the lumen.

A single pellet 20 is illustrated in FIG. 1A, but according to an embodiment of this presentation more than one pellet 20 can be arranged in the lumen between the distal orifice 18 and the retainer 22. According to an embodiment of this presentation, if more than one pellet 20 is arranged in the lumen between the distal orifice 18 and the retainer, the more than one pellet 20 can each have a same shape and/or size or they can have different shapes or sizes. Similarly, the more than one pellet can comprise the same reagent or the same mixture of reagents or they can comprise each a different reagent or different mixtures of reagents. If at least two pellets comprise different reagents, they can have different shapes or size or different colors to ease visual inspection of the content of the container. If at least two pellets comprise different reagents that could interfere, a pellet of neutral excipient(s) (soluble and/or insoluble neutral excipients) and/or an additional retainer can be arranged between such two pellets. According to an embodiment of this presentation, the pellets 20 can be hemispherical or spherical.

FIG. 1B illustrates a radial cross-section of a pipette tip container 10 at the height of the distal end 24 of the retainer 22 in lumen 14, and shows in particular the axial opening 38 and the portion 28 of the periphery of the distal end 24, which forms a radial recess with respect to the remainder of the periphery of the distal end 24, so that is cannot touch the wall of the lumen. In FIG. 1B, the retainer 22 is not lowered in conical lumen 14 enough to have any part of the periphery of the distal end 24 contact the wall 30 of lumen 14. Nevertheless, according to an embodiment of this presentation, the recessed portion 28 is arranged such that, even if the retainer 22 is lowered in lumen 14 enough to have part of the periphery of the distal end 24 contact the wall 30 of lumen 14, portion 28 will not contact the wall 30 of lumen 14. According to an embodiment of this presentation, the openings 36', 36" in the arms 34', 34" develop each from portion 28 so as to form a fluid path together with the axial opening in retainer 22 between the arms 34', 34"(retainer 22 can be essentially hollow). Because retainer 22 has the general shape of a trunk of a cone, portion 28 together with openings 36', 36" that develop each from portion 28 as well as the axial opening between the arms 34', 34", guarantee that a fluid can always pass retainer 22 in lumen 14. Axial opening 38 as well as the radial openings 36''' and 36'''' between the arms 34', 34" further allow a fluid to pass retainer 22 in lumen 14.

FIG. 1C illustrates a radial cross-section of container 10 at the height of the proximal end 26 of the retainer 22 in lumen 14, and shows in particular the axial opening between the pads 32', 32" at the end of the arms 34', 34" of retainer 22, and the radial openings 36''' and 36'''' between the arms of retainer 22.

FIG. 2A illustrates a partly opened side view of a pipette tip container 10' according to an embodiment of this presentation, which essentially differs from the pipette tip container 10 illustrated in FIGS. 1A-C in that more than one (two illustrated) pellets 20 are maintained in lumen 14 by retainer 22, and in that a distal portion 30' of the inner wall 30 of the lumen comprises at least one protrusion 40 (one or more generally axial ridges in FIG. 2) arranged to prevent a full periphery of the first pellet 20 from contacting a full periphery of the inner wall 30 of the lumen, thus guaranteeing that the first pellet 20 does not block a fluid path in lumen 14. According to an embodiment of this presentation, in pipette tip container 10', a proximal portion of the pipette tip 12, before proximal end 16, can be cylindrical with a cylindrical lumen, for example for ease of handling the pipette tip container with an automated pipette.

According to an embodiment of this presentation, pipette tip container 10' also comprises a stopper 42 arranged to prevent the first pellet 20 from reaching a position close to the distal orifice 18 of the lumen where a full periphery of the first pellet 20 could contact a full periphery of the inner wall 30 of the lumen, thus making sure that the first pellet 20 does not block a fluid path in lumen 14. It is noted that according to an embodiment of this presentation, the pipette tip container 10 can comprise one or more stoppers 42, and/or one or more protrusions 40 having the function outlined hereabove.

According to an embodiment of this presentation, pipette tip container 10' also comprises a filter 44, that is arranged between retainer 22 and proximal opening 16, and that prevents passage of solids or liquids. Filter 44 can for example help preventing a contamination of an automated pipette that manipulates the container.

Figure 2B:
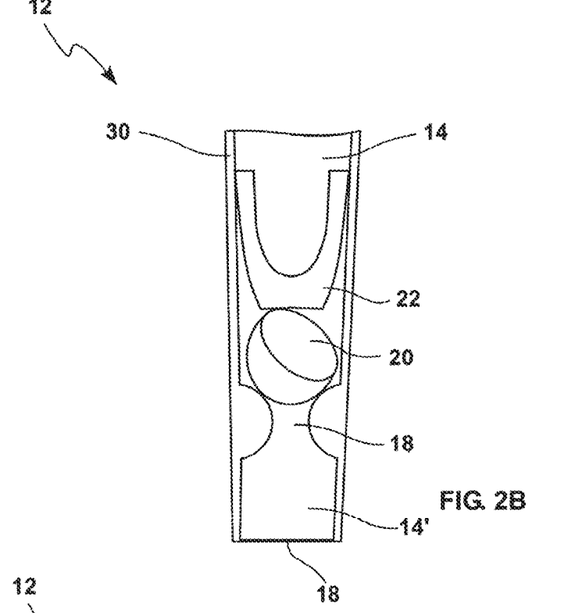
FIG. 2B schematically represents the distal extremity of a pipette tip container according to an embodiment of this presentation.

FIG. 2B schematically represents the distal extremity of a pipette tip container according to an embodiment of this presentation, where the pipette tip 12 comprises a further lumen 14' axially aligned with the lumen 14; the further lumen 14' extending between the distal orifice 18 of the lumen 14 and a distal extremity of the pipette tip having an opening 18'; the further lumen 14' and the opening 18' of the distal extremity of the pipette tip 12 having a diameter larger than the diameter of distal orifice 18. FIG. 2B additionally relates to a pipette tip 12 having a cylindrical lumen 14 and a cylindrical further lumen 14', as well as a cylindrical outer wall.

Figure 2C:
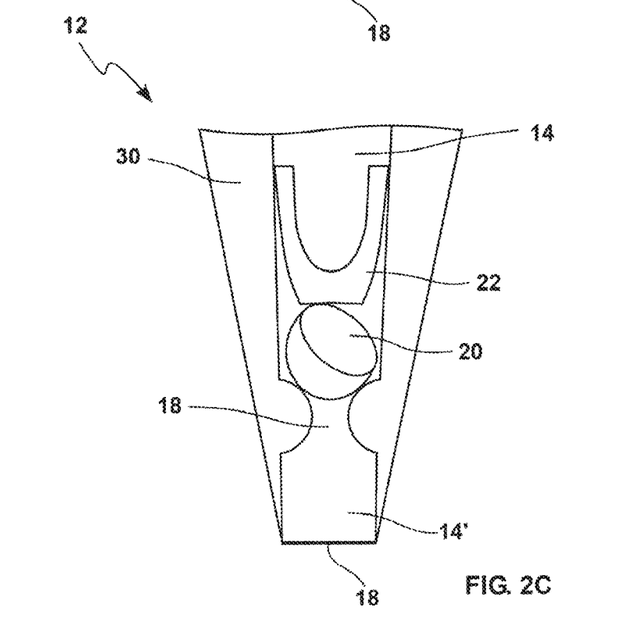
FIG. 2C schematically represents the distal extremity of a pipette tip container according to an embodiment of this presentation.

FIG. 2C schematically represents the distal extremity of a pipette tip container according to an embodiment of this presentation, where as in FIG. 2B, the pipette tip 12 comprises a further lumen 14' axially aligned with the lumen 14; the further lumen 14' extending between the distal orifice 18 of the lumen 14 and a distal extremity of the pipette tip having an opening 18'; the further lumen 14' and the opening 18' of the distal extremity of the pipette tip 12 having a diameter larger than the diameter of distal orifice 18. FIG. 2C additionally relates to a pipette tip 12 having a cylindrical lumen 14 and a cylindrical further lumen 14', together with a conical outer wall.

Figure 3A:
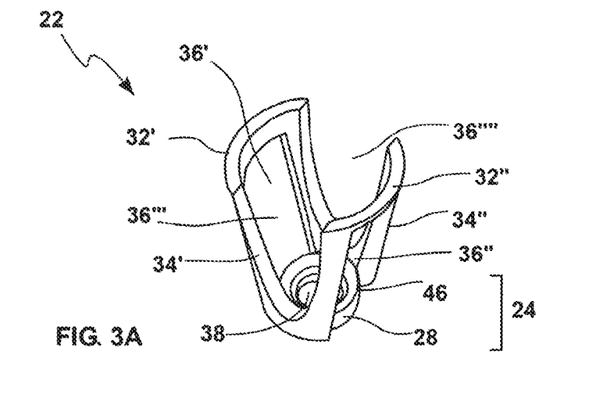
FIG. 3A schematically represents an elevation view of a retainer according to an embodiment of this presentation.

FIG. 3A schematically represents an elevation view of a retainer 22 according to an embodiment of this presentation, having a longitudinal axis wherein the at least two resilient pad portions 32', 32" follow each an arc of a circle concentric with said longitudinal axis. According to an embodiment of this presentation, the distal end 24 of the retainer 22 comprises a ring portion 46 concentric with said longitudinal axis and attached to a distal portion of each of the resilient arms 34', 34"; an outer diameter of the ring portion 46 being reduced in an alignment of the radial opening of each resilient arm. According to an embodiment of this presentation, retainer 22 can be molded as a single piece; in a material that provides the arms 34', 34" and the pads 32', 32" with at least a degree of resilience.

Figure 3B:
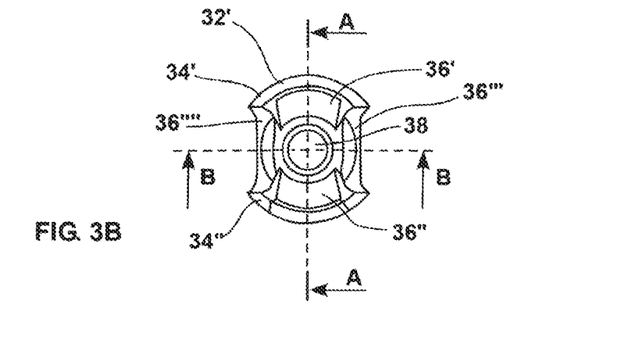
FIG. 3B schematically represents a top view of a retainer according to an embodiment of this presentation.

FIG. 3B schematically represents a top view of a retainer according to an embodiment of this presentation, showing in particular with clarity the axial opening 38 in the distal end of retainer 22 as well as the axial opening between the arms 34', 34"; the radial openings 36', 36" in the arms 34', 34" and the radial openings 36''', 36'''' between the arms 36', 36".

Figure 3C:
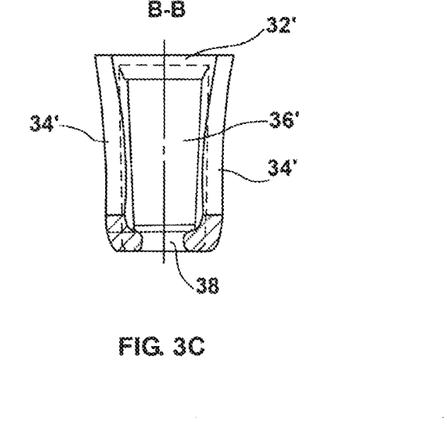
FIG. 3C schematically represents a first axial cross section of a retainer according to an embodiment of this presentation.

FIG. 3C schematically represents an axial cross section of the retainer 22, along the plane B-B illustrated in FIG. 3B and showing arm 34' with radial aperture 36' and pad 32', as well as axial aperture 38.

Figure 3D:
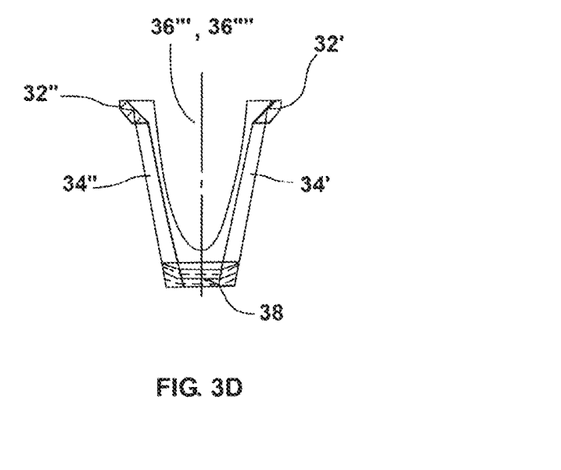
FIG. 3D schematically represents a second axial cross section of a retainer according to an embodiment of this presentation.

FIG. 3D schematically represents an axial cross section of the retainer 22, along the plane A-A illustrated in FIG. 3B and showing arms 34' and 34" with pads 32', 32" at the end of the arms and radial apertures 36''' and 36'''' between the arms, as well as axial aperture 38 and the axial aperture between the arms (and pads).

FIG. 4 schematically represents a partially opened elevation view of a pipette tip container 10 according to an embodiment of this presentation, enclosed in a sealed storage package 50. According to an embodiment of this presentation, package 50 can be made of an opaque material, so as to protect from light and moisture the reagent pellets 20 in pipette tip container 10. Package 50 can for example be molded in two parts, including a generally cylindrical bottom part 50', having a closed bottom and an top opening; and a generally flat cap 50" having flange 52 sealably attached to the rim of the top opening of bottom part 50'. Bottom part 50' can also comprise a proximal part that is cylindrical and a distal part that is a trunk of a cone as illustrated. According to an embodiment of this presentation, cap 50" comprises a holder part 54 arranged for removably holding pipette tip container 10 by its proximal portion; the holder part 54 comprising a top opening 56 that is sealably closed by an airtight film 58. Film 58 can be glued or heat-attached or assembled to the top opening 54 in any suitable manner. According to an embodiment of this presentation, package 50 is arranged such that pipette tip container 10 touches the package 50 only by its proximal portion. This allows reducing the shocks to the pellets 20, in particular if the pipette tip 12 is made of a material that is somewhat resilient, as well as reducing heat transfer to the pellets from the outside of package 50, during storage. According to an embodiment of this presentation package 50 can be sealed under vacuum or filled with a neutral gas.

According to an embodiment of this presentation, in order to use the pipette tip container 10 the film 58 must be pierced or removed (manually or automatically) so as to gain access to the proximal end 16, then pipette tip 16 can be attached to an automated pump or pipette to allow an automatic diluting and mixing of the reagent(s) in pipette tip container 10, such as detailed hereafter.

Figure 5:
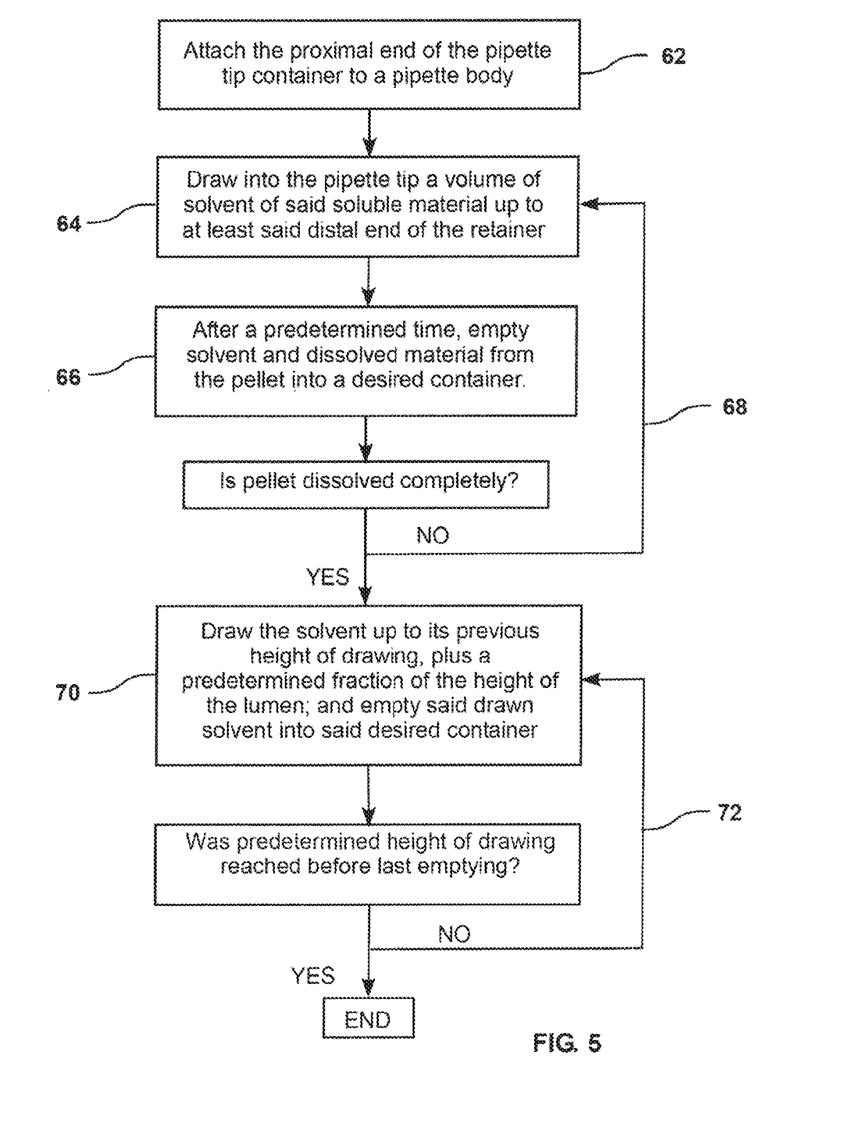
FIG. 5 illustrates a method of use of a pipette tip container according to an embodiment of this presentation.

FIG. 5 illustrates a method 60 of use of a pipette tip container 10 (10') according to an embodiment of this presentation, comprising: attaching 62 the proximal end 16 of the pipette tip 12 to a pipette body; and drawing 64 into the pipette tip 12 a volume of solvent of the material of the pellet 20 up to at least the distal end 24 of the retainer 22. According to an embodiment of this presentation, the retainer 22 prevents the pellet(s) 20 in lumen 14 from floating on top of the solvent when the solvent is drawn into lumen 14, thus improving the exposure of pellet(s) 20 to the solvent and facilitating the dissolution of pellet(s) 20. The dissolution of pellet(s) can be total or partial (for example when the pellet(s) consist of soluble and insoluble reagent(s)). According to an embodiment of this presentation, the solvent is chosen from aqueous, organic, polar and non-polar solvents and mixtures thereof.

According to an embodiment of this presentation, after a predetermined time has lapsed, the solvent in pipette tip 12 is emptied 66 into a desired container. The predetermined time can be chosen such that at least a portion of the pellet(s) 20 has dissolved in the solvent in pipette tip 12. According to an embodiment of this presentation, as long as the soluble reagent(s) of the pellet(s) are not completely dissolved, the method 60 comprises repeating 68 said drawing 64 of the solvent up to at least the distal end of the retainer 22; and after a predetermined time emptying 66 the solvent and dissolved material from the pellet(s) into the desired container. A complete dissolving of the pellets or of the soluble reagent(s) of the pellets can be detected automatically by for example optical sensors. According to an embodiment of this presentation, this process of solubilization and passive homogenization is efficient and preferred to mechanical shaking, to preserve sensitive biological reagents from precipitation or conformational change.

According to an embodiment of this presentation, after the pellets have completely dissolved and the last material dissolved from the pellet has been emptied 66 into the desired container, the method comprises drawing 70 the solvent up to its previous height of drawing, plus a predetermined fraction of the height of the lumen 14; then emptying said drawn solvent into said desired container after a second predetermined time. This further drawing of solvent into the lumen 14 is provided to "wash" any dust trace of the reagent of the pellet that could have detached from the pellet during storage and would have remained somehow attached to the wall 30 of the lumen 14 above the retainer 22. This further drawing also allows achieving the complete solubility and homogeneity of the material in solvent and washing the walls of the lumen of a too concentrated material residue from the dissolving of the pellet.

According to an embodiment of this presentation, the retainer 22 has a shape provided for avoiding the formation of foam when a solvent/diluent is drawn into the lumen 14 beyond retainer 22. The inventors have discovered that a retainer 22 as described hereabove, arranged let fluid move past the retainer in the lumen and in particular having a distal end and a proximal end of larger diameter, wherein at least a portion of a periphery of the distal end of the retainer cannot contact the inner wall of the lumen and wherein at least a portion of a periphery of the proximal end of the retainer exerts resilient pressure on the inner wall of the lumen and maintains the retainer in the lumen by friction with the inner wall of the lumen, is adapted to avoid such formation of foam; in particular if the distal end of the retainer further comprises an axial opening as well as the beginning of at least one lateral opening developing further in the retainer; the axial opening and the lateral opening having non-parallel axis; and in particular if the retainer has a shape such as claimed in the present application and/or illustrated in FIGS. 3A-D.

According to an embodiment of this presentation, the "washing" is repeated 72 by gradually drawing more solvent into the lumen 14, then emptying the lumen into the desired container, until a predetermined height of drawing is reached, then emptied in the desired container. The material of the pellet is thereafter ready for use in an homogeneous, liquid form in the desired container. According to an embodiment of this presentation, method 60 can be automated. Implementation of pipette tip containers as described hereabove in an automated reconstitution process such as an automated method 60 reduces the potential risk of contamination during set-up, increases efficiency and reduces experimental errors during set-up, and ensures overall reliability and accurate reproducibility of results.

Figure 6:
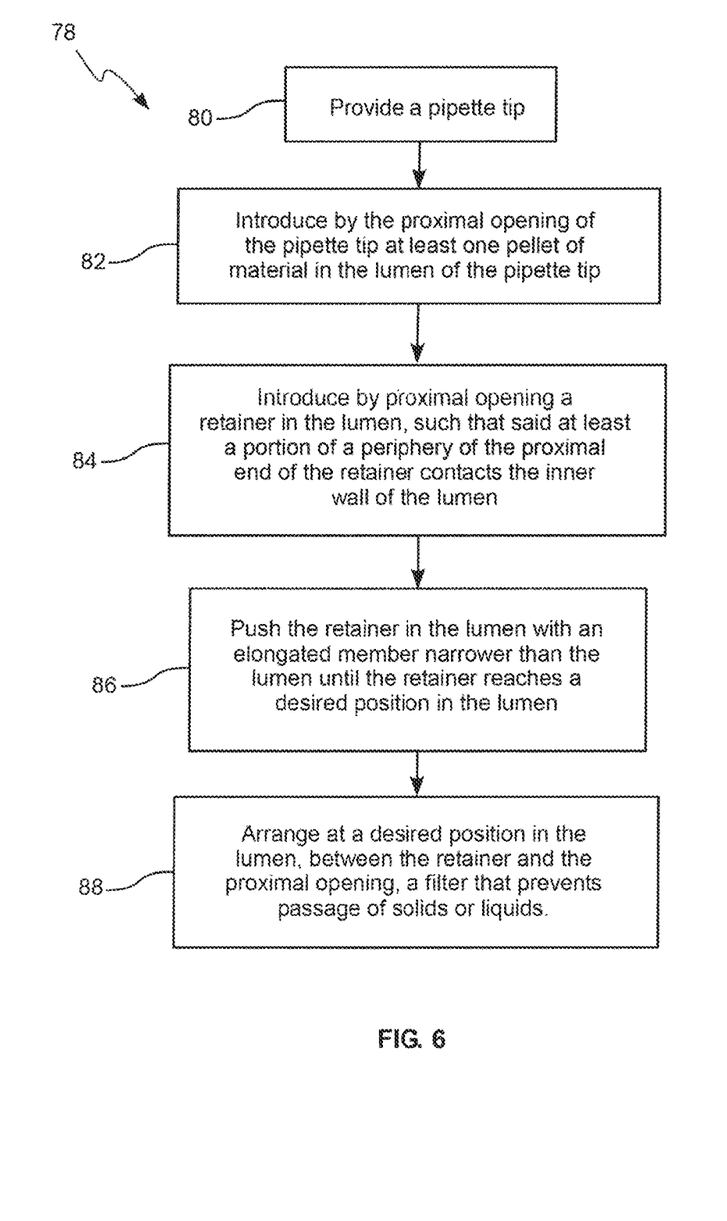
FIG. 6 illustrates a method of making a pipette tip container according to an embodiment of this presentation.

FIG. 6 illustrates a method 78 of making a pipette tip container 10 according to an embodiment of this presentation, the method comprising: providing 80 a pipette tip 12; introducing (e.g. dropping) 82 by the proximal opening 16 at least one pellet 20 of material in the lumen 14 of the pipette tip 12; introducing (e.g. dropping) 84 by the proximal opening a retainer 22 in the lumen 14, such that at least a portion 32 of a periphery of a proximal end 26 of the retainer 22 contacts the inner wall 30 of the lumen 14; and thereafter pushing 86 the retainer 22 in the lumen 14 with an elongated member narrower than the lumen 14 (thus causing arms 34', 34" to resiliently exert pressure on the walls 30 of lumen 14) until the retainer 22 reaches a desired position in the lumen 14; for example such that the distal end 24 of retainer 22 touches the top of the at least one pellet 20 in lumen 14, or is close to said top of the at least one pellet. According to an embodiment of this presentation the method can optionally comprise arranging 88 at a desired position in the lumen 14, between the retainer 22 and the proximal opening 16, a filter 44 that prevents passage of solids or liquids.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following: A pipette tip container comprising a pipette tip having a lumen extending between a proximal opening of a first diameter and a distal orifice of a second smaller diameter; a pellet arranged in the lumen of the pipette tip between said proximal opening and distal orifice, the second diameter being too narrow to let the pellet pass; and a retainer arranged between the pellet and the proximal opening and arranged to prevent the pellet from moving past the retainer in the lumen but to let fluid move past the retainer in the lumen; the retainer having a distal end such that a portion of its periphery does not contact the inner wall of the lumen, a proximal end such that a portion of its periphery maintains the retainer in the lumen by friction with the inner wall of the lumen; and a radial opening between the distal and proximal ends.

What is claimed is:

1. A pipette tip container comprising:
   a pipette tip having a lumen extending between a proximal opening of a first diameter and a distal orifice of a second diameter smaller than the first diameter;
   at least one pellet of material arranged in the lumen of the pipette tip between said proximal opening and distal orifice, wherein the second diameter is too narrow to let the pellet pass; and
   a retainer arranged in the lumen between the pellet and said proximal opening, the retainer being arranged to prevent the at least one pellet from moving past the retainer in the lumen but to let fluid move past the retainer in the lumen;
   the retainer having a distal end and a proximal end, wherein the distal end of the retainer is circumscribed within a third diameter and the proximal end of the retainer is circumscribed within a fourth diameter, which is larger than the third diameter, wherein at least a first portion of a periphery of the distal end of the retainer does not contact an inner wall of the lumen and wherein at least a portion of a periphery of the proximal end of the retainer exerts resilient pressure on the inner wall of the lumen and maintains the retainer in the lumen by friction with the inner wall of the lumen.

2. The pipette tip container of claim 1, wherein the lumen is conical.

3. The pipette tip container of claim 1, wherein the pipette tip comprises a further lumen axially aligned with the lumen; the further lumen extending between the distal orifice of the lumen and a distal extremity of the pipette tip; the further lumen having a diameter larger than said second diameter.

4. The pipette tip container of claim 1, wherein the distal end of the retainer is distant from the proximal end of the retainer by a height larger than said fourth diameter.

5. The pipette tip container of claim 1, wherein said at least a portion of a periphery of the proximal end of the retainer that contacts the inner wall of the lumen comprises at least two pad portions coupled each to the distal end of the retainer by a resilient arm.

6. The pipette tip container of claim 5, wherein each resilient arm comprises a radial opening between the proximal end of the retainer and the distal end of the retainer, each radial opening developing from said first portion of a periphery of the distal end of the retainer; the radial openings in the arms communicating with an axial opening in the proximal end of the retainer.

7. The pipette tip container of claim 1 wherein said at least one pellet of material comprises at least two pellets of material.

8. The pipette tip container of claim 7 wherein said at least two pellets of material have a same shape and a same size.

9. The pipette tip container of claim 1, wherein said at least one pellet of material is hemispherical.

10. The pipette tip container of claim 1, wherein the distal end of the retainer comprises an axial opening and the beginning of at least one lateral opening developing further in the retainer; the axial opening and the lateral opening having non-parallel axis.

11. The pipette tip container of claim 1, wherein said retainer has a longitudinal axis and said at least a portion of a periphery of the proximal end of the retainer that contacts the inner wall of the lumen comprises at least two resilient pad portions following each an arc of a circle concentric with said longitudinal axis, each pad portion coupled to the distal end of the retainer by a resilient arm that comprises a radial opening between the proximal end of the retainer and the distal end of the retainer;
    wherein the distal end of the retainer comprises a ring portion concentric with said longitudinal axis and attached to a distal portion of each of said resilient arms;
    an outer diameter of said ring portion being reduced in an alignment of the radial opening of each resilient arm.

12. The pipette tip container of claim 1, wherein a distal portion of the inner wall of the lumen comprises a protrusion arranged to prevent a full periphery of said at least one pellet from contacting a full periphery of the inner wall of the lumen.

13. The pipette tip container of claim 1, wherein a distal portion of the lumen comprises a stopper arranged to prevent said at least one pellet from reaching a position dose to the distal orifice of the lumen where a full periphery of said at least one pellet could contact a full periphery of the inner wall of the lumen; the stopper being arranged to provide a fluid path through the lumen.

14. The pipette tip container of claim 1, comprising between said retainer and said proximal opening a filter that prevents passage of solids or liquids.

15. The pipette tip container of claim 1, wherein the pipette tip is made of a transparent material.

16. The pipette tip container of claim 1, wherein said pellet is comprised of soluble reactant.

17. A method of use of the pipette tip container of claim 16, comprising:
- attaching said proximal end to a pipette body;
- drawing into the pipette tip a volume of solvent of the soluble reactant up to at least said distal end of said retainer; and
- after at least a portion of said pellet was dissolved, emptying solvent and dissolved material from the pellet into a desired container.

18. The method of claim 17 comprising, as long as the pellet is not completely dissolved, repeating said drawing of the solvent up to at least said distal end of said retainer; and emptying said solvent and dissolved material from the pellet into said desired container.

19. The method of claim 18 comprising, after the pellet has completely dissolved and the last material dissolved from the pellet has been emptied into said desired container, drawing the solvent up to a previous height of drawing, plus a predetermined fraction of the height of the lumen; and emptying said drawn solvent into said desired container.

20. The method of claim 19, comprising repeating said drawing of the solvent up to an increasing height of the lumen and said emptying said drawn solvent into said desired container until the solvent has been drawn to a predetermined height of the lumen and emptied into said desired container.

21. A method of making a pipette tip container as recited in claim 1; the method comprising:
- providing said pipette tip;
- introducing by the proximal opening said at least one pellet of material in the lumen of the pipette tip;
- introducing by the proximal opening said retainer in the lumen, such that said at least a portion of a periphery of the proximal end of the retainer contacts the inner wall of the lumen; and
- pushing said retainer in the lumen with an elongated member narrower than the lumen until the retainer reaches a desired position in the lumen.

22. The method of claim 21, further comprising arranging at a desired position in the lumen, between the retainer and the proximal opening, a filter that prevents passage of solids or liquids.

* * * * *